(12) United States Patent
Matsui et al.

(10) Patent No.: US 7,581,754 B2
(45) Date of Patent: Sep. 1, 2009

(54) AIRBAG APPARATUS AND METHOD OF MANUFACTURING AIRBAG

(75) Inventors: Yoshitaka Matsui, Kanzaki-gun (JP);
Kei Tsujimoto, Hikone (JP); Wataru Nakazawa, Higashiomi (JP); Masahiko Kaifuki, Aki-gun (JP)

(73) Assignee: Takata Corporation, Tokyo (JP)

( * ) Notice: Subject to any disclaimer, the term of this patent is extended or adjusted under 35 U.S.C. 154(b) by 143 days.

(21) Appl. No.: 11/139,800

(22) Filed: May 31, 2005

(65) Prior Publication Data
US 2005/0263995 A1    Dec. 1, 2005

(30) Foreign Application Priority Data
May 31, 2004    (JP)    ............... 2004-161144

(51) Int. Cl.
*B60R 21/16*    (2006.01)
(52) U.S. Cl. .................................. 280/743.1
(58) Field of Classification Search .............. 280/730.1, 280/743.1, 732
See application file for complete search history.

(56) References Cited

U.S. PATENT DOCUMENTS

| 5,018,761 | A | | 5/1991 | Henseler et al. |
| 5,547,215 | A | | 8/1996 | Taguchi et al. |
| 5,782,488 | A | * | 7/1998 | Lewis et al. ............... 280/743.1 |
| 5,836,612 | A | * | 11/1998 | Lang ....................... 280/743.1 |
| 5,954,361 | A | * | 9/1999 | Lang ....................... 280/743.2 |
| 5,975,571 | A | * | 11/1999 | Ford et al. ............... 280/743.1 |
| 6,003,896 | A | * | 12/1999 | Dyer ....................... 280/743.1 |
| 6,536,800 | B2 | * | 3/2003 | Kumagai et al. ......... 280/743.1 |
| 2004/0026909 | A1 | | 2/2004 | Rensinghoff |

FOREIGN PATENT DOCUMENTS

JP    3124651    10/2000

* cited by examiner

*Primary Examiner*—Paul N. Dickson
*Assistant Examiner*—Robert A. Coker
(74) *Attorney, Agent, or Firm*—Manabu Kanesaka

(57) ABSTRACT

An airbag apparatus to be mounted on a vehicle such as a motor vehicle includes an airbag and a gas supply device. The airbag is inflated to a rear side of a vehicle from a front side thereof in front of a vehicle passenger for protecting the passenger in case of a vehicle accident. The airbag includes a right airbag section extending vertically on a right side of the vehicle and a left airbag section extending vertically on a left side of the vehicle in the inflated state. The right or left airbag section located closer to a side portion of the vehicle has an upper edge lower than that of the left or right airbag section, so that the right or left airbag section does not interfere with the side portion.

11 Claims, 5 Drawing Sheets backside of vehicle ← → front side of vehicle left side of vehicle ← → right side of vehicle

AIRBAG APPARATUS AND METHOD OF MANUFACTURING AIRBAG

BACKGROUND OF THE INVENTION AND RELATED ART STATEMENT

The present invention relates to an airbag apparatus to be mounted to a vehicle, and a method of manufacturing an airbag.

Conventionally, an airbag is inflated for deploying in a passenger protection area in a vehicle in case of vehicle accident. For example, in Patent Document 1, a passenger airbag to be installed for a passenger seat of the vehicle is described. In Patent Document 1, an amount of gas flowing through an injection port formed in the airbag is adjusted, so that the airbag can effectively constrain a passenger. When this type of airbag is designed, it is desirable to obtain proper passenger constraint with the airbag while optimizing a behavior of the airbag upon a vehicle accident. For example, when a front window has a significantly rounded shape, a front pillar (A-pillar) of a vehicle wall may be greatly inclined. In this case, when the airbag is inflated to deploy in the vicinity of a vehicle wall, it is desirable to deploy the airbag in a desired mode along a shape of the vehicle such as the vehicle wall for securely constraining the occupant.

Patent Document 1: Japanese Patent Publication (Kokai) No. 03-10947

In view of such circumstances, it is an object of the present invention to provide an airbag apparatus for effectively protecting a passenger in case of a vehicle accident.

Further objects and advantages of the invention will be apparent from the following description of the invention.

SUMMARY OF THE INVENTION

In order to achieve the objects described above, according to a first aspect of the present invention, an airbag apparatus to be mounted to a vehicle such as a motor vehicle includes an airbag and a gas supply device. The airbag is deployed and inflated to a rear side of a vehicle from a front side of the vehicle in front of a vehicle passenger toward a passenger protection area for protecting the vehicle passenger in case of a vehicle accident. The airbag includes a right airbag section extending in a vertical direction on a right side of the vehicle and a left airbag section extending in the vertical direction on a left side of the vehicle in the deployed and inflated state.

In the present invention, the right airbag section and the left airbag section are sufficient as long as they include components extending like a wall in the vertical direction. An entire shape thereof may be a curved shape or linear shape. The gas supply device is provided for supplying gas to deploy and inflate the airbag described above. Typically, the gas supply device includes an inflator having a function of generating gas to deploy and inflate the airbag upon the vehicle accident.

In the present invention, the airbag is configured such that, in the deployed and inflated state, a position of an upper edge of one of the right airbag section or the left airbag sections closer to a vehicle wall is lower than that of an upper edge of the other airbag section. Accordingly, the one airbag section of the airbag is prevented from interfering with a vehicle wall in the deployed and inflated state. More specifically, when the airbag for a passenger seat is installed on the left side of a right-hand drive car, the position of the upper edge of the left airbag section in the deployed and inflated state is lower than the position of the upper edge of the right airbag section. When the airbag for a passenger seat is installed on the right side of a left-hand drive car, the position of the upper edge of the right airbag section in the deployed and inflated state is lower than the position of the upper edge of the left airbag section. Accordingly, one of the airbag sections of the airbag deployed and inflated in the passenger protection area is prevented from interfering with the vehicle wall.

The vehicle wall includes a member of a vehicle body of the vehicle, and widely includes members which may interfere with the airbag in the deployed and inflated state. Typically, the vehicle wall includes a pillar of a vehicle body, a window, a door, and a seat or the like. When the airbag is prevented from interfering, an action of the airbag deployed and inflated is prevented from being hindered by the vehicle wall. Accordingly, there are a case in which a space for avoiding interference is formed between one of the airbag sections and the vehicle wall, and a case in which the one airbag section abuts against the vehicle wall to an extent that the action of the airbag is not hindered.

In the first aspect, when the airbag is deployed and inflated in the passenger protection area in a case of a vehicle accident, one of the left and right airbag sections closer to the vehicle wall is prevented from interfering with the vehicle wall, thereby preventing the airbag sections from being interfered with the vehicle wall. Accordingly, the airbag can be deployed and inflated in an intended and desired mode in the passenger protection area, thereby properly protecting the passenger in a case of a vehicle accident.

According to a second aspect of the present invention, a method of manufacturing an airbag of the airbag apparatus according to the first aspect includes a first step of preparing a plurality of panels constituting the airbag, and a second step for sewing the plurality of panels.

In the first step, a first panel corresponding to one of the right airbag section and the left airbag section of, the airbag closer to the vehicle wall, a second panel corresponding to the other airbag section, and a third panel interposed between the first panel and the second panel are prepared. Then, these panels are fabricated so that a vertical length of the first panel becomes shorter than the vertical length of the second panel. The airbag may be formed of only the first panel, the second panel, and the third panel, or may be formed of panels other than these three panels as needed. In the present invention, the airbag may be formed of one each of the first panel, the second panel, and the third panel, or a plurality of members of those.

In the second step, the third panel is interposed between the first panel and the second panel, and these panels are stitched to each other to form a bag-shaped airbag. Then, it is formed such that the position of the upper edge of the first panel of the airbag in the deployed and inflated state comes to a position lower than the upper edge of the second panel. In the airbag, the shape such that the upper edge of the first panel comes to a position lower than the upper edge of the second panel may be achieved by the shapes of the respective panels of the airbag, or may be achieved by tension of a belt-shaped tether or the like connecting inner wall surfaces of the airbag.

With the airbag manufactured by these steps, one of the left and right airbag sections including the first panel is prevented from interfering with the vehicle wall when being deployed and inflated in a case of a vehicle accident.

In the second aspect, the airbag is deployed and inflated in the passenger protection area in an intended and desired mode, thereby properly protecting the passenger in a case of a vehicle accident.

As described above, according to the present invention, thorough protection of the passenger in a case of a vehicle accident is achieved by the airbag which can be deployed and inflated in an intended and desired mode in the passenger protection area.

DETAILED DESCRIPTION OF PREFERRED EMBODIMENTS

Hereunder, embodiments of the present invention will be described in detail with reference to the drawings. Referring to FIG. 1 to FIG. 4, a structure of an airbag apparatus 110 will be described. The airbag apparatus 110 is an airbag apparatus to be mounted to a motor vehicle of a type having a right-hand drive corresponding to a passenger seated on a passenger seat.

Figure 1:
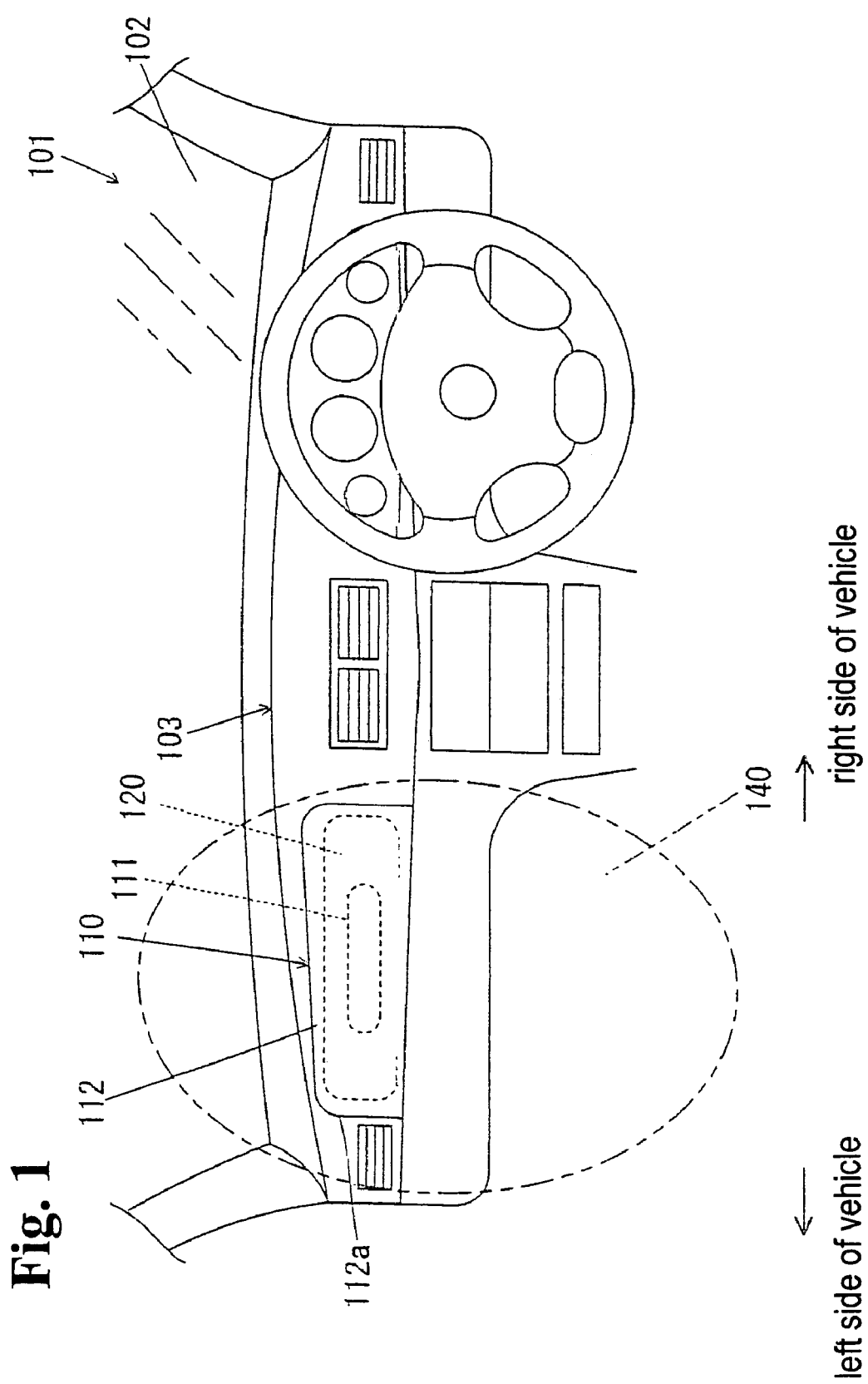
FIG. 1 is a view showing an airbag apparatus installed on a vehicle body of a motor vehicle according to an embodiment of the present invention.

A state in which the airbag apparatus 110 of the embodiment is installed on a vehicle body 101 of the motor vehicle is shown in FIG. 1. As shown in FIG. 1, the airbag apparatus 110 corresponds to an airbag apparatus of the present invention, and is mounted to a dashboard 103 located behind a front window 102 of the vehicle body 101 on a side of the passenger seat. The airbag apparatus 110 basically includes an airbag 120 to be stored in a state folded into a predetermined folded shape (accordion shape or roll shape); an inflator 111 for generating and supplying gas to an internal space of the airbag 120 to deploy and inflate the airbag 120 (corresponding to a gas supply device in the present invention); and an airbag cover 112 for covering the passenger side of the airbag 120.

In case of vehicle accident such as a vehicle collision, the airbag 120 has a function to be deployed and inflated in a passenger protection area 140 for protecting the passenger seated on the passenger seat while tearing the airbag cover 112 along a tear line 112a. The passenger protection area 140 is defined as an area for protecting the passenger seated on the passenger seat quickly and reliably, and corresponds to a passenger protection area in the present invention.

Figure 2:
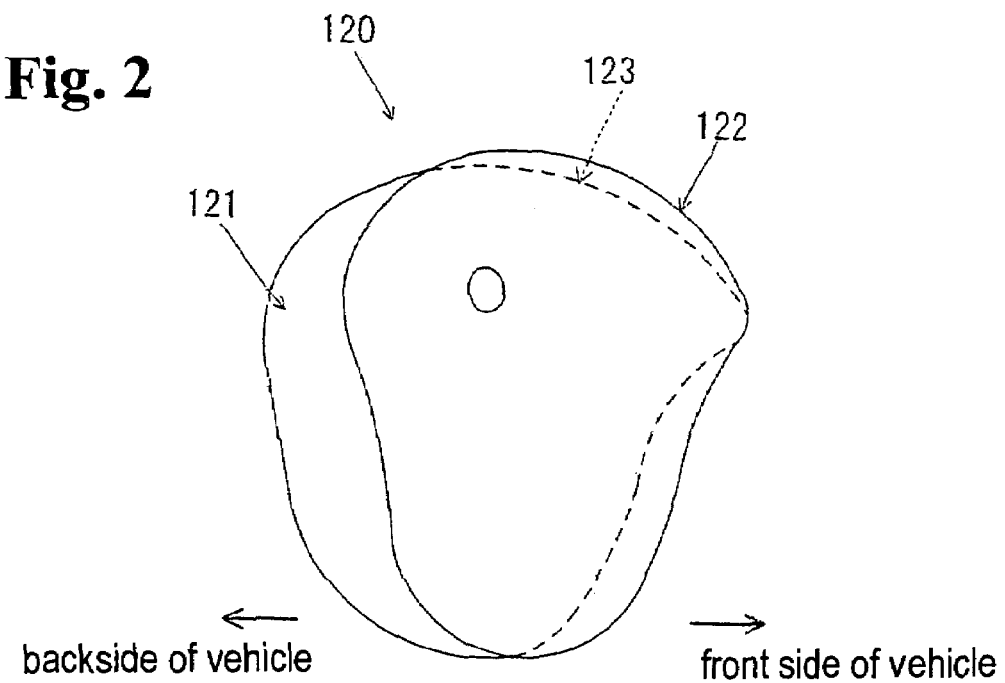
FIG. 2 is a perspective view of an airbag in a deployed and inflated state.
Figure 3:
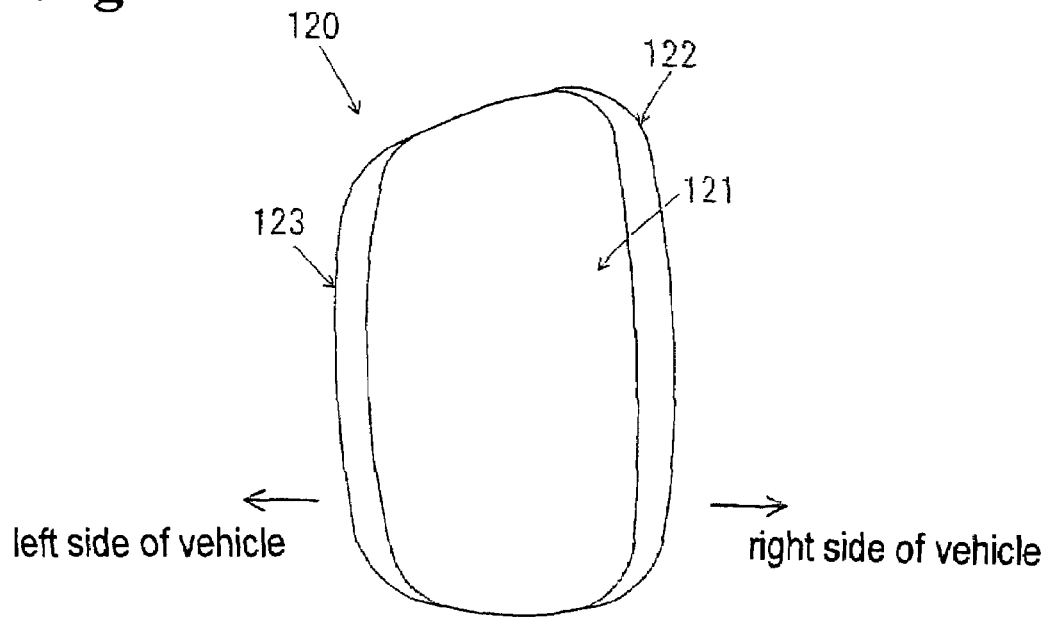
FIG. 3 is a front view of the airbag in the deployed and inflated state when viewed from behind the vehicle.
Figure 4:
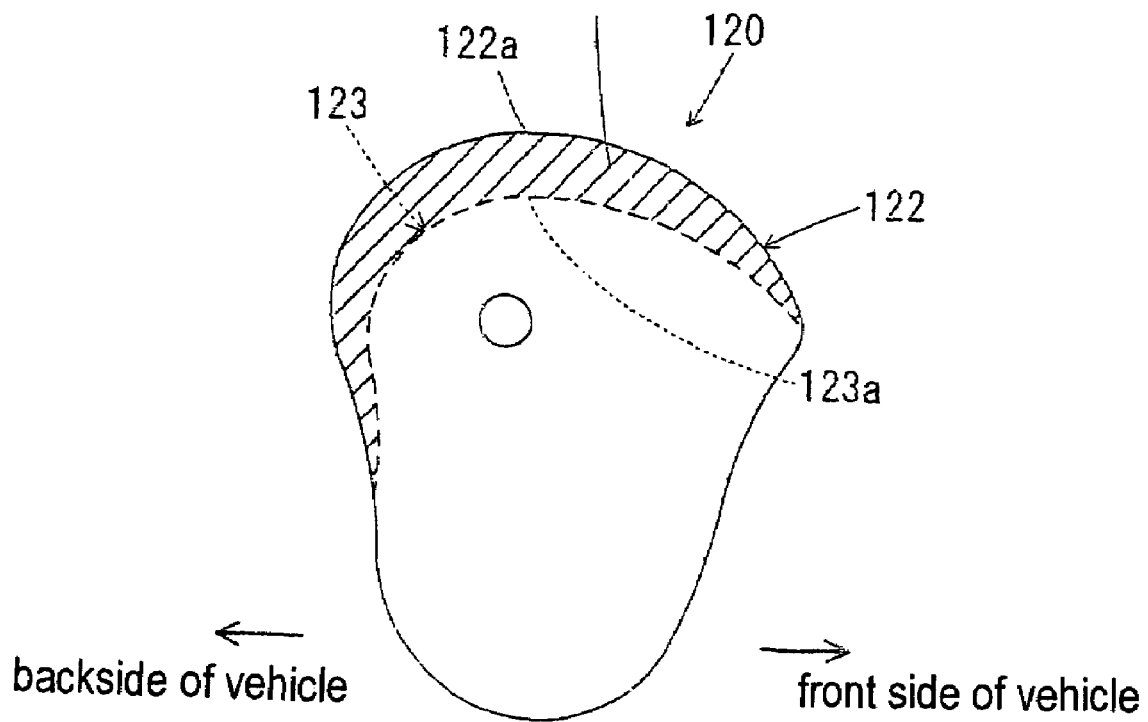
FIG. 4 is a side view of the airbag in the deployed and inflated state when viewed from a right side of the vehicle.

A structure of the airbag 120 in the deployed and inflated state is shown in FIG. 2 to FIG. 4. FIG. 2 is a perspective view of the airbag 120 in the deployed and inflated state; FIG. 3 is a front view of the airbag 120 in the deployed and inflated state viewed from a rear side of the vehicle; and FIG. 4 shows a side view of the airbag 120 in the deployed and inflated state viewed from a right side of the vehicle.

As shown in FIG. 2 to FIG. 4, the airbag 120 includes, in the deployed and inflated state, a right airbag section 122 extending vertically like a wall on the right side of the vehicle; a left airbag section 123 extending vertically like a wall on the left side of the vehicle; and a center airbag section 121 extending between the right airbag section 122 and the left airbag section 123. The airbag 120 corresponds to an airbag in the present invention.

In the embodiment, in particular, the right airbag section 122 and the left airbag section 123 are formed asymmetrically. More specifically, the right airbag section 122 and the left airbag section 123 are formed substantially symmetrically as shown in FIG. 4. When the right airbag section 122 and the left airbag section 123 are overlapped with each other, the left airbag section 123 located on the left side of the vehicle is smaller than the right airbag section 122 located on the right side of the vehicle by an extent of difference in dimension (a hatched portion in FIG. 4) as shown in FIG. 3. In other words, the left airbag section 123 is adapted in such a manner that the vertically extending length in FIG. 4 is shorter than the right airbag section 122, and a position of an upper edge 123a of the left airbag section 123 is adapted to be lower than a position of an upper edge 122a of the right airbag section 122. Accordingly, when the airbag 120 is deployed and inflated, the position of the upper edge 123a of the left airbag section 123 becomes lower than the upper edge 122a of the right airbag section 122.

In the airbag 120 in the deployed and inflated state, the left airbag section 123 corresponds to the airbag section on the side closer to the vehicle wall (a vehicle wall 105, described later), and corresponds to one of the airbag sections in the present invention. The right airbag section 122 corresponds to the other airbag section in the present invention.

Figure 5:
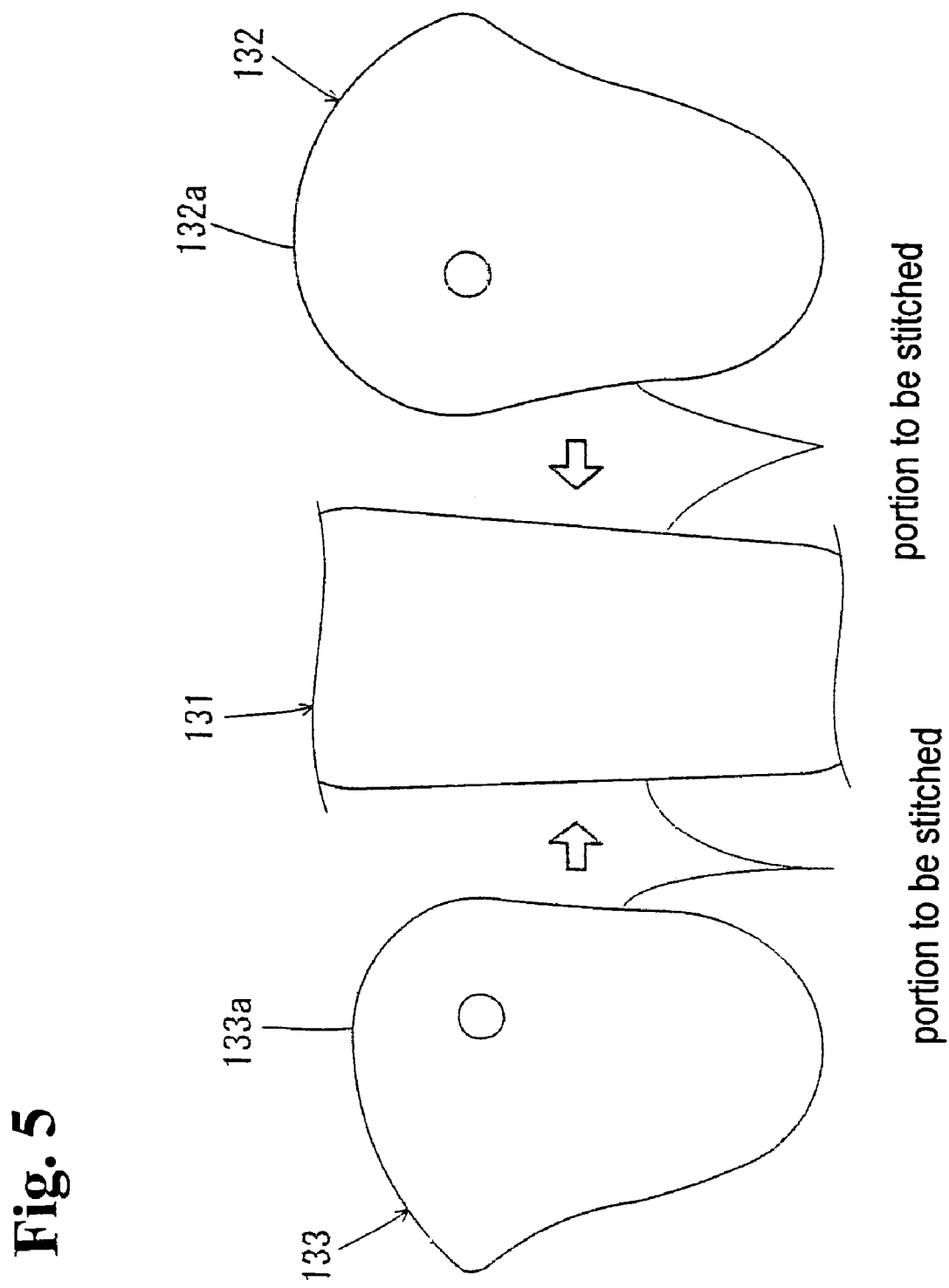
FIG. 5 shows the airbag in a state before manufacturing by stitching.

A procedure of manufacturing the airbag 120 having the structure described above will be described by referring to FIG. 5. FIG. 5 shows a state before manufacturing the airbag 120 having the structure described above by stitching.

When manufacturing the airbag 120 having the structure described above, three textile fabric panels including a main panel 131, a right panel 132, and a left panel 133, which are asymmetry as shown in FIG. 5, are prepared in a step of machining a textile fabric. The main panel 131, the right panel 132, and the left panel 133 are textile fabric panels having dimensions matching respectively to the center airbag section 121, the right airbag section 122, and the left airbag section 123. The left side panel 133 has a vertically extending length shorter than the right panel 132, and a position of an upper edge 133a of the left panel 133 is lower than a position of an upper edge 132a of the right panel 132. The main panel 131 in this embodiment corresponds to a third panel in the present invention, the right panel 132 corresponds to a second panel in the present invention, and the left panel 133 corresponds to a first panel in the present invention.

In the next step, in a state in which the right panel 132 and the left panel 133 are disposed on both sides of the main panel 131, these panels are stitched to each other along the stitching portion. Accordingly, the airbag 120 is manufactured to have the structure shown in FIG. 2 to FIG. 4, in which the main panel 131 corresponds to the center airbag section 121, the right panel 132 corresponds to the right airbag section 122, and the left panel 133 corresponds to the left airbag section 123. The manufacturing method of the airbag 120 as described above corresponds to a method of manufacturing an airbag.

In the airbag 120 manufactured in the steps described above, when being deployed and inflated, the upper edge 132a of the right panel 132 is aligned with the upper edge 122a of the right airbag section 122, and the upper edge 133a of the left panel 133 is aligned with the upper edge 123a of the left airbag section 123. In other words, according to this embodiment, the shape is defined by shapes of the right panel 132 and the left panel 133, so that the position of the upper edge 123a of the left airbag section 123 becomes lower than the position of the upper edge 122a of the right airbag section 122. When forming such a shape, it is also possible to provide a belt-shaped tether or the like in the airbag 120 for connecting the inner wall surfaces with respect to each other as needed, and utilize the tension force by the tether.

Figure 6:
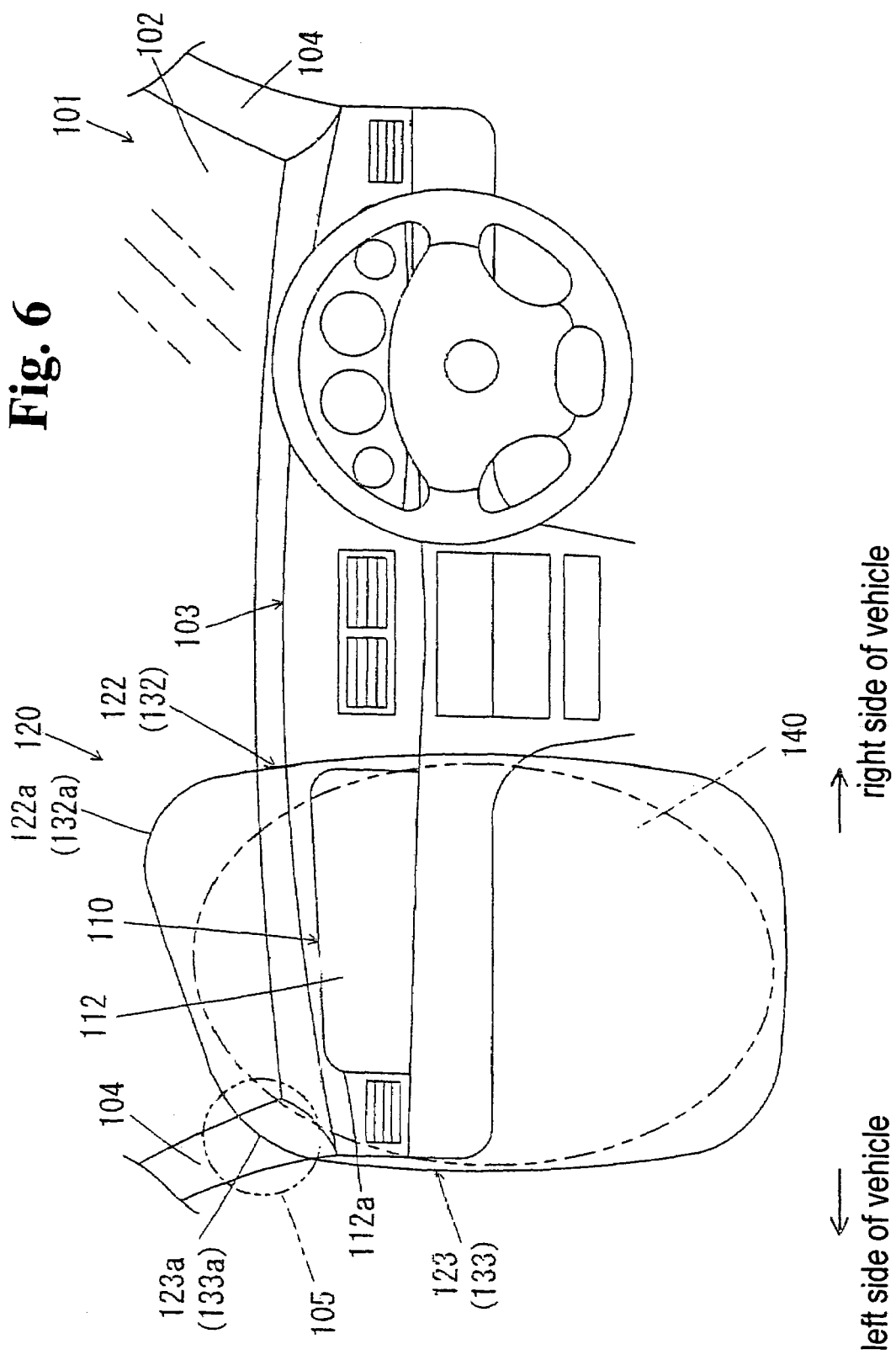
FIG. 6 shows a state in which the airbag is deployed and inflated in a passenger protection area.

Referring to FIG. 6, an operation of the airbag 120 having the structure will be described. FIG. 6 shows a state in which the airbag 120 is deployed and inflated in a passenger protection area 140.

In case of a vehicle accident, the airbag apparatus 110 in the initial state is activated, and gas for deployment and inflation is generated from an inflator (the inflator 111 in FIG. 1). The gas for deployment and inflation generated from the inflator flows into the internal space of the airbag 120. Accordingly, the entire airbag 120 initiates the deployment and inflation (the action to be inflated while being deployed), and the airbag cover 112 is pushed and opened by tearing along the tear line 112a. Accordingly, the airbag is deployed and inflated rearward toward the passenger protection area 140 on the rear side of the vehicle as a whole.

In this manner, the airbag 120 is deployed and inflated in the area covering the passenger protection area 140 as shown by a phantom line in FIG. 6. Then, the vertically extending right airbag section 122 is formed on the right side of the vehicle in the airbag 120, and the vertically extending left airbag section 123 is formed on the left side of the vehicle.

At this time, in the airbag 120 of this embodiment, the position of the upper edge 123a of the left airbag section 123 becomes lower then the position of the upper edge 122a of the right airbag section 122 as described above. Accordingly, a space for avoiding interference can be formed between the left airbag section 123 and the vehicle wall portion 105 from the initiation of the deployment and inflation to the completion of the deployment and inflation, so that the left airbag section 123 is prevented from interfering with the vehicle wall. The vehicle wall 105 corresponds to a vehicle wall in the present invention. In other words, in this embodiment, when the airbag 120 is deployed and inflated, the shape of the left airbag section 123 (left panel 133), specifically the relative vertical position of the upper edge 123a (upper edge 133a) with respect to the upper edge 122a (upper edge 132a), is determined so as to avoid interference between the left airbag section 123 and the vehicle wall 105.

The vehicle wall 105 is formed of a front pillar (A-pillar) 104 and the front window 102, and the structure in which the left airbag section 123 interferes with the vehicle wall 105 may be a cause to impair deployment and inflation of the airbag 120 in a desired mode. In particular, when the front window 102 has a significantly rounded shape, the front pillar 104 is accordingly inclined, so that the possibility of interference of the left airbag section 123 with the vehicle wall 105 increases. Accordingly, in this embodiment, the structure prevents the interference between the left airbag section 123 and the vehicle wall 105.

According to the structure of the airbag 120 of this embodiment described above, when the airbag 120 is deployed and inflated in the passenger protection area 140 in case of a vehicle accident, interference of the left airbag section 123 with the vehicle wall 105 can be avoided. More specifically, such phenomenon that the left airbag section 123 interferes with the vehicle wall 105 and bounces when being deployed and inflated can be prevented. Accordingly, the airbag 120 can be deployed and inflated in an intended and desired state in the passenger protection area 140.

The present invention is not limited to the embodiment described above, and various applications or modification can be made. For example, the following respective embodiments to which the aforementioned embodiments are applied can be implemented.

In the aforementioned embodiment, the airbag 120 is formed by stitching the three panels including the main panel 131, the right panel 132, and the left panel 133 together. The airbag may be formed of each one of the main panel 131, the right panel 132, the left panel 133, or a plurality of panels. It is also possible to combine the panels other than the main panel 131, the right panel 132, and the left panel 133.

In the above-described embodiment, the airbag apparatus is mounted for protecting the passenger seated on the passenger seat of the motor vehicle. The present invention can be applied to a structure of an airbag apparatus mounted for protecting a passenger seated on a seat other than the passenger seat. In this case, the vehicle wall as an object of interference of the airbag may be determined as needed according to types of airbag and vehicle structure in the periphery of the airbag. For example, the vehicle wall is constituted of the pillar of the vehicle body, the window, the door, the seat or the like.

In the above-described embodiment, the airbag apparatus for the motor vehicle has been described. The present invention is applicable to the airbag apparatus in vehicles other than motor vehicle, for example, ships or trains.

The disclosure of Japanese Patent Application No. 2004-161144, filed on May 31, 2004, is incorporated in the application.

While the invention has been explained with reference to the specific embodiments of the invention, the explanation is illustrative and the invention is limited only by the appended claims.

What is claimed is:

1. An airbag apparatus comprising:
an airbag disposed in front of a passenger to be inflated toward a rear side of a vehicle for protecting the passenger in case of a vehicle accident, said airbag including a center side airbag section located in a center area of the vehicle in a width direction of the vehicle, said center side airbag section extending vertically at the center area of the vehicle in an inflated state and having highest and lowest portions in a vertical direction and front and rear portions in a front-rear direction of a vehicle, a window side airbag section located at a window side of the vehicle in the width direction, said window side airbag section extending vertically at a window side of the vehicle in the inflated state and having highest and lowest portions in the vertical direction and front and rear portions in the front-rear direction, and an upper edge extending between the center side airbag section and the window side airbag section in the inflated state, said upper edge at the window side airbag section being lower than that at the center side airbag section so that the window side airbag section does not interfere with a side portion of the vehicle, and
a gas supply device for supplying gas to inflate the vehicle airbag,
wherein a length between the highest and lowest portions of the center side airbag section is greater than a length between the front and rear portions of the center side airbag section, and a length between the highest and lowest portions of the window side airbag section is greater than a length between the front and rear portions of the window side airbag section.

2. An airbag apparatus according to claim 1, wherein said upper edge is located at a front side of the airbag facing the passenger and decreases its height linearly from the center side airbag section to the window side airbag section, and a lower edge at the front side of the airbag extends between the center side airbag section and the window side airbag section and is arranged substantially horizontally when viewed from the front side in the inflated state.

3. An airbag apparatus according to claim 2, wherein said airbag further includes a middle airbag section situated between the center and window side airbag sections.

4. An airbag apparatus according to claim 3, wherein said middle airbag section is located close to the passenger than the center side and window side airbag sections in the inflated state.

5. An airbag apparatus according to claim 3, wherein said center side airbag section has an upper side and a lower side, and said window side airbag section has an upper side and a lower side; said lower sides of the center and window side airbag sections have a shape and a size substantially same; and said upper sides of the center and window side airbag sections have a shape similar to each other and the size of the upper side of the center side airbag section is greater than that of the window side airbag section.

6. An airbag apparatus according to claim 5, wherein said front side facing the passenger has an upper portion and a lower portion at the center and window side airbag sections, the upper portion at the center side airbag section extending further rearward of the vehicle from that of the window side airbag section, the lower portions of the center and window side airbag sections having a shape substantially same and symmetrical to front lower sides of the center and window side airbag sections.

7. An airbag apparatus according to claim 1, wherein said center side airbag section comprises a center side panel having said highest and lowest portions in a vertical direction and said front and rear portions in the front*rear direction, and said window side airbag section comprises a window side panel having said highest and lowest portions in the vertical direction and said front and rear portions in the front-rear direction.

8. A method of manufacturing an airbag, comprising:
preparing a first panel corresponding to a center side airbag section to be located at a center area of a vehicle in a width direction, a second panel corresponding to a window side airbag section to be located at a window side of the vehicle in the width direction, and a third panel, said second panel being smaller than the first panel and formed asymmetrically with respect to the first panel,
fabricating the first and second panels so that the first panel has a vertical length greater than that of the second panel, and
connecting the first, second and third panels to form a bag-shaped airbag, said third panel being interposed between the first and second panels so that an upper edge extends between the center side airbag section and the window side airbag section, is located in a highest portion of the airbag in an inflated state and decreases from the center side airbag section to the window side airbag section in the inflated state.

9. A method of manufacturing an airbag according to claim 8, wherein said first and second panels are prepared such that the center side airbag section has an upper side and a lower side, and said window side airbag section has an upper side and a lower side; said lower sides of the center and window side airbag sections have a shape and a size substantially same; and said upper sides of the center and window side airbag sections have a shape similar to each other and the size of the upper side of the center side airbag section is greater than that of the window side airbag section.

10. An airbag apparatus comprising:
an airbag disposed in front of a passenger to be inflated toward a rear side of a vehicle for protecting the passenger in case of a vehicle accident, said airbag including a center side airbag section located in a center area of the vehicle in a width direction of the vehicle, said center side airbag section extending vertically at the center area of the vehicle in an inflated state in a front-rear direction, a window side airbag section located at a window side of the vehicle in the width direction, said window side airbag section extending vertically at a window side of the vehicle in the inflated state in the front-rear direction, and an upper edge extending between the center side airbag section and the window side airbag section in the inflated state, said upper edge at the window side airbag section being lower than that at the center side airbag section so that the window side airbag section does not interfere with a side portion of the vehicle, and
a gas supply device for supplying gas to inflate the vehicle airbag,
wherein said airbag further includes a front side facing the passenger, a curved upper portion extending from the front side to a back side at a side opposite to the front side through the upper edge, and a curved lower portion extending from the front side to the back side through a lower edge extending substantially horizontally in the inflated state,
the curved upper portion has a size greater than that of the curved lower portion when viewed from a side of the airbag, and
the curved lower portion at the center side airbag section has a shape same as that of the window side airbag section, and has a semi-circular shape.

11. An airbag apparatus according to claim 10, wherein said center side airbag section comprises a center side panel having highest and lowest portions in a vertical direction and front and rear portions in the front-rear direction, a length between the highest and lowest portions in the center side panel being greater than a length between the front and rear portions in the center side panel, and
said window side airbag section comprises a window side panel having highest and lowest portions in the vertical direction and front and rear portions in the front-rear direction, a length between the highest and lowest portions in the window side panel being greater than a length between the front and rear portions in the window side panel.

* * * * *